US012689236B2

(12) United States Patent
 Katsuya

(10) Patent No.: US 12,689,236 B2
(45) Date of Patent: Jul. 21, 2026

(54) NON-CONTACT POWER TRANSMISSION SYSTEM AND NON-CONTACT POWER TRANSMISSION METHOD

(71) Applicant: HONDA MOTOR CO., LTD., Tokyo (JP)

(72) Inventor: Jin Katsuya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/062,264

(22) Filed: Feb. 25, 2025

(65) Prior Publication Data

US 2025/0309690 A1 Oct. 2, 2025

(30) Foreign Application Priority Data

Mar. 27, 2024 (JP) ................................. 2024-050992

(51) Int. Cl.
 *H02J 50/12* (2016.01)
 *B60L 53/126* (2019.01)
 (Continued)

(52) U.S. Cl.
 CPC ............ *H02J 50/12* (2016.02); *B60L 53/126* (2019.02); *H02J 50/80* (2016.02); *H02J 50/90* (2016.02); *B60L 53/38* (2019.02)

(58) Field of Classification Search
 CPC .. H02J 50/12; H02J 50/80; H02J 50/90; H02J 50/10; H02J 50/00; H02J 50/40; B60L 53/38; B60L 53/126
 See application file for complete search history.

(56) References Cited

U.S. PATENT DOCUMENTS

| 12,545,130 B2 * | 2/2026 | Makino | .................. B60L 53/12 |
| 2016/0023557 A1 * | 1/2016 | Dimke | ................... B60L 5/005 |
| | | | 320/108 |

(Continued)

FOREIGN PATENT DOCUMENTS

| JP | 2012-075302 | 4/2012 |
| JP | 2017-163824 | 9/2017 |

(Continued)

OTHER PUBLICATIONS

Japanese Notice of Allowance for Japanese Patent Application No. 2024-050992 mailed Oct. 14, 2025.

(Continued)

*Primary Examiner* — Jacob M Amick
(74) *Attorney, Agent, or Firm* — Amin, Turocy & Watson, LLP

(57) ABSTRACT

A non-contact power transmission system of an embodiment is a non-contact power transmission system that supplies electric power in a non-contact state from a power supply device provided in a moving path of a moving body to a power reception device provided in the moving body, wherein the power reception device includes: a position determination unit which determines a position of the power supply device; and a power reception side control unit which performs pairing by magnetic field coupling between the power reception device and the power supply device determined by the position determination unit and performs an electric power reception control based on electric power obtained from the paired power supply device, and wherein the power supply device includes a power supply side control unit which supplies electric power corresponding to required electric power from the paired power reception device to the power reception device.

7 Claims, 9 Drawing Sheets

(51) Int. Cl.
　　*H02J 50/80*　　　(2016.01)
　　*H02J 50/90*　　　(2016.01)
　　*B60L 53/38*　　　(2019.01)

(56) References Cited

U.S. PATENT DOCUMENTS

| | | | |
|---|---|---|---|
| 2016/0339790 A1 | 11/2016 | Tsukamoto | |
| 2022/0024329 A1* | 1/2022 | Cho | B60L 53/32 |
| 2025/0010748 A1* | 1/2025 | Lee | B60L 53/38 |
| 2025/0083541 A1* | 3/2025 | Obayashi | B60L 53/122 |

FOREIGN PATENT DOCUMENTS

| | | |
|---|---|---|
| JP | 2018-133930 | 8/2018 |
| JP | 2018-200512 | 12/2018 |
| JP | 2020-072502 | 5/2020 |
| WO | 2015/114796 | 8/2015 |

OTHER PUBLICATIONS

Japanese Office Action for Japanese Patent Application No. 2024-050992 mailed May 27, 2025.

\* cited by examiner

NON-CONTACT POWER TRANSMISSION SYSTEM AND NON-CONTACT POWER TRANSMISSION METHOD

CROSS-REFERENCE TO RELATED APPLICATION

Priority is claimed on Japanese Patent Application No. 2024-050992, filed on Mar. 27, 2024, the contents of which are incorporated herein by reference.

BACKGROUND

Field of the Invention

The present invention relates to a non-contact power transmission system and a non-contact power transmission method.

Background

In recent years, research and development has been conducted into vehicle charging using secondary batteries that contribute to energy efficiency in order to ensure that more people have access to affordable, reliable, sustainable and advanced energy. Regarding this, in a non-contact power transmission system that supplies power to a vehicle from the outside of the vehicle by non-contact power transmission, there is known a system that controls the available power supply state depending on the presence or absence of authentication between a power transmission side and a power reception side of non-contact power transmission or that controls a switching frequency of a power transmission side power conversion unit depending on the load on the power reception side of the non-contact power transmission (for example, see Japanese Unexamined Patent Application, First Publication No. 2012-75302 and Japanese Unexamined Patent Application, First Publication No. 2017-163824).

SUMMARY

In a technology related to charging and supplying power to moving objects such as vehicles equipped with secondary batteries, when a moving object overtakes another moving object in a charging lane or cuts in between moving objects and the like depending on the situation of the moving path, different types of moving objects pass by one after another, and appropriate individual determination of the moving object may not be possible. In order to handle this problem, there are methods such as a Double-LCC method, in which the impedance of the coil increases except directly above, and power is not automatically transmitted. However, when another vehicle with a similar coil passes, power transmission starts, and hence mixed traffic is not possible. Conventionally, there is a method of determining by installing four ultra-wideband (UWB) determination coils on the ground surface and two on the vehicle side and the like, but if the determination coils are embedded in the road to perform non-contact power supply while driving, the performance is degraded and this method cannot be used. In this way, conventionally, there has been a problem that appropriate power transmission may not be possible.

An object of the present application is to provide a non-contact power transmission system and a non-contact power transmission method capable of performing more appropriate power transmission to a moving body. Then, the present application ultimately contributes to improved energy efficiency.

A non-contact power transmission system according to a first aspect of the present invention is a non-contact power transmission system that supplies electric power in a non-contact state from a power supply device provided in a moving path of a moving body to a power reception device provided in the moving body, wherein the power reception device includes: a position determination unit which determines the position of the power supply device; and a power reception side control unit which performs pairing by magnetic field coupling between the power reception device and the power supply device determined by the position determination unit and performs an electric power reception control based on electric power obtained from the paired power supply device, and wherein the power supply device includes a power supply side control unit which supplies electric power corresponding to required electric power from the paired power reception device to the power reception device.

A second aspect is the non-contact power transmission system according to the first aspect described above, wherein the power supply device may include a power supply side communication unit which communicates with the power reception device using a voltage waveform generated by magnetic field coupling based on a signal from the power reception device.

A third aspect is the non-contact power transmission system according to the first aspect described above, wherein each of the power supply device and the power reception device may include a voltage dividing unit which divides a voltage generated by a received signal, and the power supply side control unit may cause the voltage dividing unit to convert a waveform of the voltage into a rectangular wave and acquire bit string information.

A fourth aspect is the non-contact power transmission system according to the first aspect described above, wherein the power reception side control unit may control a phase shift amount of a signal from the power reception device to be smaller than a threshold value.

A fifth aspect is the non-contact power transmission system according to the first aspect described above, wherein the moving body may include: a determination device which recognizes a surrounding situation; and a driving control unit which controls at least steering of a speed and the steering of the moving body based on an output of the determination device, and the moving body may be positioned at a position corresponding to the position of the power supply device determined by the position determination unit based on driving control performed by the driving control unit so that the moving body travels on a middle of the moving path.

A sixth aspect is the non-contact power transmission system according to the first aspect described above, wherein the power supply device may perform communication with the power reception device when an efficiency of power transmission with the power reception device is equal to or smaller than a predetermined value, and perform power supply control for the power reception device when the efficiency is larger than the predetermined value.

A non-contact power transmission method according to a seventh aspect of the present invention is a non-contact power transmission method of supplying electric power in a non-contact state from a power supply device provided in a moving path of a moving body to a power reception device provided in the moving body, the non-contact power transmission method including: by way of the power reception device, determining the position of the power supply device; by way of the power reception device, performing pairing by weak magnetic field coupling between the power reception device and the determined power supply device; by way of the power reception device, performing an electric power reception control based on electric power obtained from the paired power supply device; and by way of the power supply device, supplying electric power corresponding to required electric power from the power reception device paired by the pairing to the power reception device.

According to the above-described first to seventh aspects, more appropriate power transmission to a moving body can be performed.

BRIEF DESCRIPTION OF THE DRAWINGS

FIG. 1 is a schematic configuration diagram of a non-contact power transmission system according to an embodiment.

FIG. 4 is a diagram showing an example of a circuit configuration on a power transmission side and a power reception side of the embodiment.

FIG. 5 is a diagram showing an example of the circuit configuration of a power transmission unit and a power reception unit.

DESCRIPTION OF EMBODIMENTS

Figure 2:
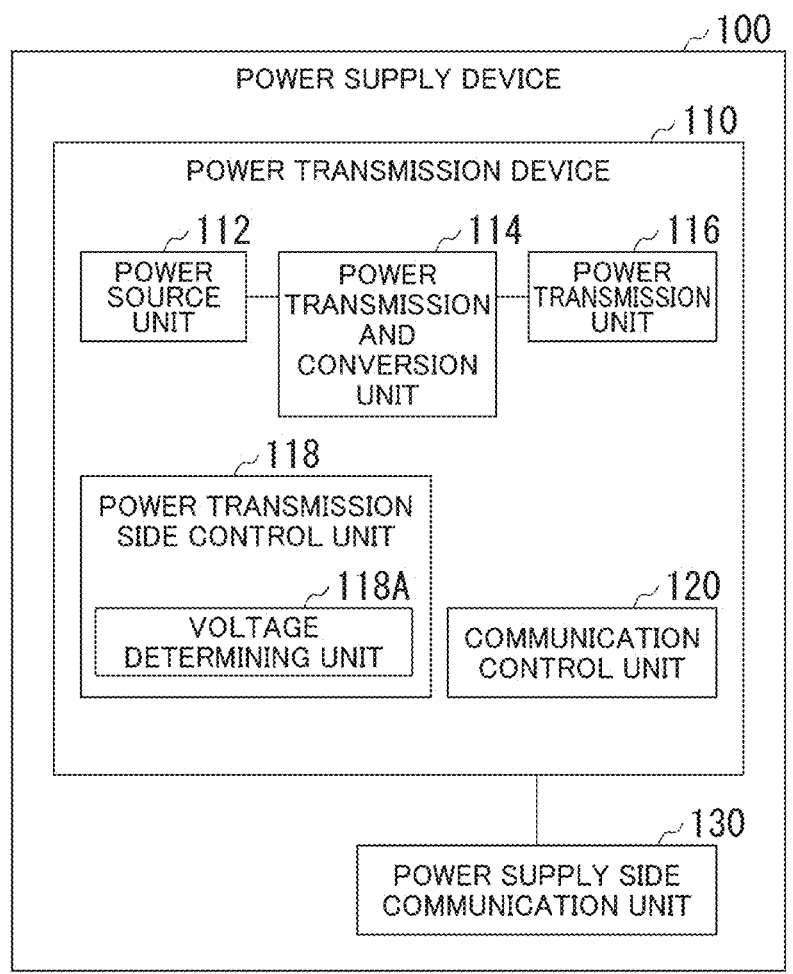
FIG. 2 is a diagram showing an example of the configuration of a power supply device of the embodiment.

Hereinafter, a non-contact power transmission system and a non-contact power transmission method according to an embodiment of the present invention will be described with reference to the drawings.

[System Configuration]

Figure 1:
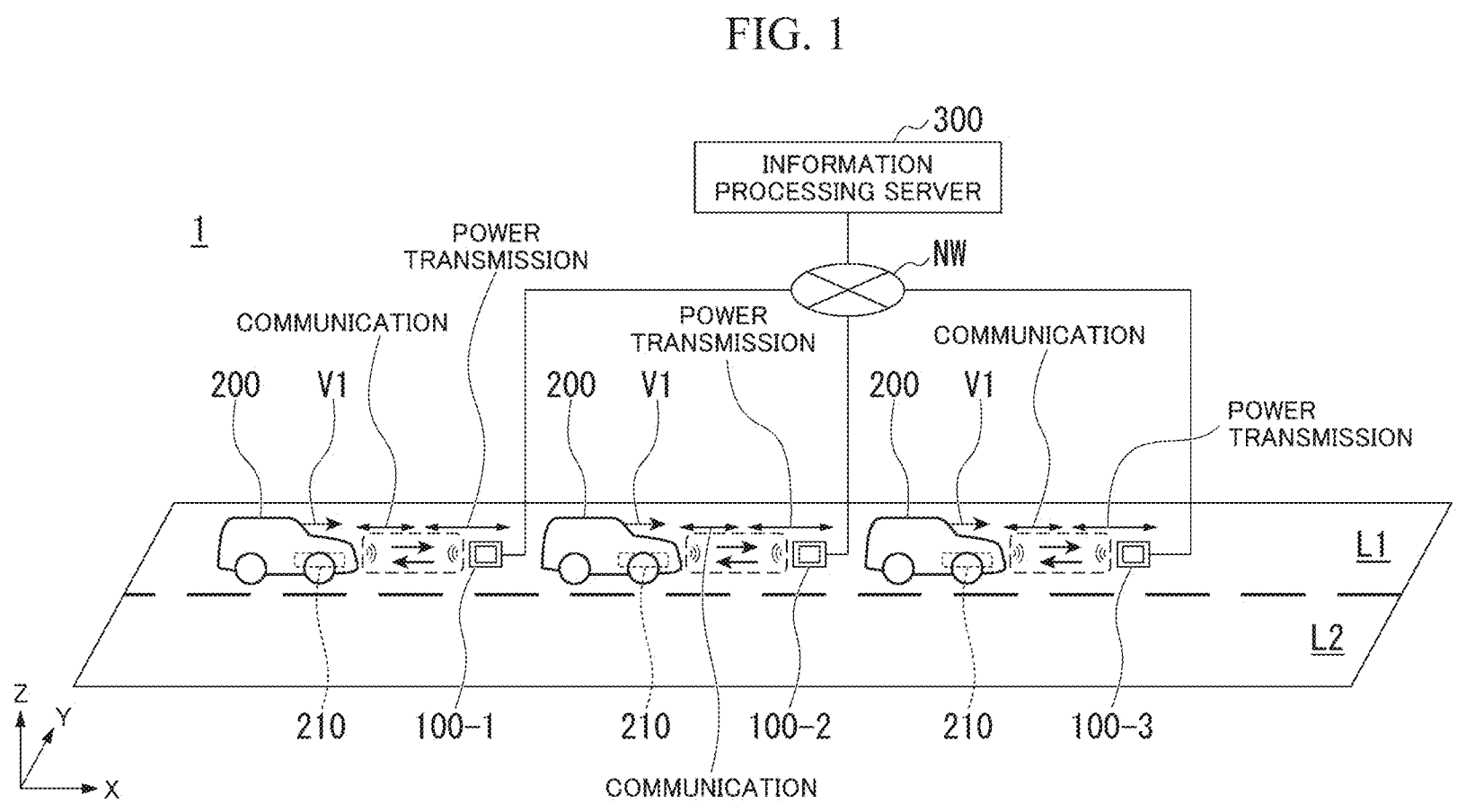

FIG. 1 is a schematic configuration diagram of a non-contact power transmission system according to an embodiment. A non-contact power transmission system 1 according to the embodiment includes, for example, a power supply device 100, a vehicle 200 which is an example of a moving body, and an information processing server 300. The power supply device 100 and the information processing server 300 communicate with each other via, for example, a network NW. The network NW includes, for example, an Internet, a Wide Area Network (WAN), a Local Area Network (LAN), a cellular network, a public line, a provider device, a wireless base station, and the like. Furthermore, in the non-contact power transmission system 1, the vehicle 200 may also communicate with the information processing server 300 via the network NW using a communication device mounted thereon. Further, in the non-contact power transmission system 1, the power supply device 100 and the vehicle 200 communicate with each other using other communication means to be described later. Further, in the non-contact power transmission system 1, the vehicle 200 is, for example, an electric vehicle, a hybrid vehicle, a fuel cell vehicle, or the like. Furthermore, the moving body of the embodiment may be an object that can move along a moving path such as an electric robot other than the vehicle 200. Further, the moving body may or may not carry a person on board. Further, the moving body may be configured to be capable of performing automatic driving as well as manual driving by an occupant (driver). In the following description, the moving body will be described as a vehicle.

The non-contact power transmission system 1 supplies power from the power supply device 100 to the vehicle 200 by the non-contact power transmission between the power supply device 100 and the vehicle 200. Furthermore, in the non-contact power transmission system 1, the power supply device 100 supplies power to the plurality of vehicles 200, and the vehicle 200 receives power from the plurality of power supply devices 100. However, for convenience of description, a description will be made by focusing on one-to-one non-contact power supply.

The power supply device 100 is installed (buried) at a predetermined interval on a road surface of a predetermined power supply lane (for example, lane L1) among lanes L1 and L2 (examples of moving paths) on which the vehicle 200 can travel (for example, power supply devices 100-1, 100-2, 100-3, and the like shown in FIG. 1).

The predetermined interval is, for example, an interval at which the magnetic field coupling regions of the power supply devices 100 do not overlap. Further, the predetermined interval may be set according to the type of road (for example, general road or expressway) or according to traffic regulations such as the speed limit of the road. For example, the power supply device 100 communicates with the vehicle 200 that approaches within a predetermined distance, and supplies power in response to a power supply request from the vehicle 200. Further, the power supply device 100 performs a process related to power control and power protection functions (for example, fail-safe action (FSA)) in response to a request.

The vehicle 200 is equipped with a power reception device 210. The power reception device 210 is installed at the bottom of the vehicle 200 so as to easily receive power from the power supply device installed on the road surface and the like, but the installation position is not limited thereto. The power reception device 210 performs processes related to, for example, vehicle energy management and power protection functions (for example, FSA). Further, the vehicle 200 travels using power stored in a power storage unit such as an on-board battery, and supplies power to other on-board devices. Further, the vehicle 200 communicates with the power supply devices 100-1 to 100-3 while traveling in the power supply lane (lane L1), and charges the power storage unit mounted on the vehicle 200 using power supplied in response to a request. In the non-contact power transmission system 1, the communication system required between the power supply device 100 and the vehicle 200 is a system that can at least individually identify the vehicle 200 and can communicate with the vehicle 200 when the vehicle 200 is moving at a speed V1 of about 0 to 100 km/h. The functional configurations of the power supply device 100 and the vehicle 200 will be described in detail later.

The information processing server 300 may be, for example, a server device or a personal computer (PC), or may be a cloud server and the like configured by cloud computing including one or more information processing devices. The information processing server 300 communicates with the power supply device 100, the vehicle 200, and the like, and performs various processes and the like related to power. The information processing server 300 may be, for example, a billing system related to non-contact power supply, an electricity bidding system, or a system linked to these systems. The billing system is, for example, a system for individually identifying the vehicle 200 and collecting a fee according to the charged power amount. The electricity bidding system is, for example, a system that performs various controls and management to conduct low-cost electricity bidding and the like based on demand forecasts.

Further, the information processing server 300 manages the state of the power supply device 100, accumulates the power supplied from each of the power supply devices 100-1 to 100-3 to the vehicle 200, calculates and manages the actual power transmitted to each vehicle 200, and the like.

[Power Supply Device]

FIG. 2 is a diagram showing an example of a configuration of the power supply device 100 of the embodiment. The power supply device 100 includes, for example, a power transmission device 110 and a power supply side communication unit 130. The power transmission device 110 includes, for example, a power source unit 112, a power transmission and conversion unit 114, a power transmission unit 116, a power transmission side control unit (an example of a power supply side control unit) 118, and a communication control unit 120. The power transmission side control unit 118 includes a voltage determining unit 118A. A part or all of the power transmission side control unit 118 and the communication control unit 120 is realized by, for example, a hardware processor such as a central processing unit (CPU) executing a program (software). A part or all of these components may be realized by hardware (including circuitry) such as a large scale integration (LSI), an application specific integrated circuit (ASIC), a field-programmable gate array (FPGA), a graphics processing unit (GPU), or a system on chip (SOC), or may be realized by a combination of software and hardware. The program may be stored in advance in a storage device (a storage device having a non-transient storage medium) such as a hard disk drive (HDD) or flash memory of the power supply device 100, or may be stored in a removable storage medium such as a DVD or CD-ROM, and installed in the HDD or flash memory of the power supply device 100 by attaching the storage medium (non-transient storage medium) to a drive device.

The power source unit 112 of the power transmission device 110 is connected to the power transmission and conversion unit 114. The power source unit 112 includes, for example, an AC power supply such as a commercial power supply, an AC-DC converter that converts the AC power into DC power, and a power smoothing capacitor. For example, the power source unit 112 converts AC power supplied from an AC power source into DC power using an AC-DC converter. Further, the power source unit 112 performs a power smoothing process using a capacitor during power conversion.

The power transmission and conversion unit 114 is connected to the power transmission unit 116. The power transmission and conversion unit 114 includes, for example, an inverter that converts DC power into AC power. The inverter includes, for example, a bridge circuit formed by a plurality of switching elements and rectifying elements that are bridge-connected in two phases, a resonance capacitor for adjusting resonance of the coil, and a voltage dividing circuit (an example of a voltage dividing unit) for voltage division. The circuit configuration of the power transmission and conversion unit 114 will be described in detail later.

The power transmission unit 116 transmits power to an external device (for example, the power reception device 210 of the vehicle 200) by changing a high-frequency magnetic field, for example, using magnetic field coupling due to magnetic field resonance. In magnetic field resonance, for example, when a current flows through a coil on the power transmission side, a magnetic field oscillation occurs, and this oscillation is transmitted to the resonant circuit on the power reception side, which resonates at the same frequency to cause a current to flow. Further, the magnetic field coupling may be achieved by a known coupling method such as electromagnetic induction other than magnetic field resonance. In electromagnetic induction, for example, power is transmitted by using an induced magnetic flux generated between a power transmission side and a power reception side.

The power transmission side control unit 118 controls each function of the power transmission device 110 or the entire power supply device 100 in an integrated manner. For example, the power transmission side control unit 118 controls pairing, power transmission, and the like based on information (for example, a pairing signal and a power reception side operation mode) and the like acquired by the power supply side communication unit 130 communicating with a vehicle side communication unit 230 of the vehicle 200. The pairing signal includes, for example, a power reception device ID which is identification information for identifying the power reception device 210 or a vehicle ID which is identification information for identifying the vehicle 200, and parameter information such as required power, battery voltage, and the like.

For example, the power transmission side control unit 118 identifies the power reception device 210 and the vehicle 200 based on the power reception device ID and the vehicle ID, and establishes (completes) pairing. Further, the power transmission side control unit 118 may refer to user information or the like registered in advance based on the power reception device ID or the vehicle ID, and establish pairing if the vehicle (or user) is capable of receiving power (can use a power supply service). The power transmission side control unit 118 controls power transmission so that power is supplied to the vehicle 200 with which pairing has been established.

The power reception side operation mode is an operation mode of the power reception device 210 (described later) mounted on the vehicle 200, and includes, for example, a short mode, a parameter transmission mode, a standby mode, a power reception mode, and the like. The short mode is a mode for preventing unexpected power reception, and is used, for example, in FSA, and the like. The parameter transmission mode is a mode for transmitting parameter information. The standby mode is, for example, a mode in which communication with the power supply side is on standby.

The power reception mode is a mode in which pairing is established and a power reception unit 211 and a power reception and conversion unit 212 are operating and waiting to receive power, or in which the power can be received or is being received based on a predetermined frequency (required frequency for resonance).

Further, the power transmission side control unit 118 controls the operation mode (power transmission side operation mode) of the power transmission device 110 according to the situation. For example, the modes include an off mode, a search mode, a standby mode, a power transmission mode and the like. The off mode in the power transmission side operation mode is a mode in which no vehicle providing service exists within the power transmission service section (electric road) and the power transmission side is not in operation. The search mode is a mode in which pairing with the vehicle 200 is established, the coupling coefficient is increased, and a state in which power transmission efficiency can be ensured is determined, and power transmission is suspended. The standby mode is, for example, a mode in which communication with the power reception side is waited for. The power transmission mode is, for example, a state (power transmission state) in which power can be transmitted based on a required frequency or a state in which power is being transmitted.

For example, the power transmission side control unit 118 shifts the operation mode of the power transmission device 110 from an off mode to a reception (standby) mode at the time when pairing with the vehicle 200 is established. Further, when the power transmission side control unit 118 receives information such as a required frequency of power transmission from the vehicle 200 from the power reception device 210 via the communication control unit 120, the power transmission side control unit 118 shifts the operation mode from a reception mode to a search mode. Furthermore, in the power transmission state, the power transmission side control unit 118 may transmit power at a preset drive frequency instead of the required frequency. The power transmission side control unit 118 transmits power to the power reception device 210 of the vehicle 200 by controlling the on (conductive) and off (interrupted) switching of each switching element of the power transmission and conversion unit 114 according to the required frequency. For example, when power transmission to the vehicle 200 side or communication therewith becomes impossible, the power transmission side control unit 118 ends pairing and shifts the power transmission device 110 to the off mode.

Further, the power transmission side control unit 118 may control billing and settlement according to the used power amount [kWh] after the system on the side of the vehicle 200 is used. Further, the voltage determining unit 118A of the power transmission side control unit 118 determines the voltage in the power transmission and conversion unit 114. The power transmission side control unit 118 acquires information (for example, bit string information) from the vehicle side based on the waveform (for example, rectangular wave) of the determined voltage. This process will be described in detail later. The power transmission side control unit 118 performs various controls and the like described above based on various information acquired through communication between the power supply side communication unit 130 and the vehicle side communication unit 230, or information acquired based on the voltage waveform.

The communication control unit 120 controls the operation of the power supply side communication unit 130. For example, when the power supply device 100 includes the plurality of power supply side communication units 130, the communication control unit 120 controls the operations of all power supply side communication units 130. For example, the communication control unit 120 attempts to acquire predetermined information (for example, a pairing signal or information on power transmission (for example, a required frequency, information required for billing and settlement after using the system, and the like)) through communication between the power supply side communication unit 130 and the vehicle side communication unit 230 of the surrounding vehicle 200 at a timing such as a predetermined period. The communication control unit 120 outputs the acquired information to the power transmission side control unit 118, and transmits information acquired from the power transmission side control unit 118 (pairing establishment information and information necessary to start power transmission), and the like to the vehicle side communication unit 230 via the power supply side communication unit 130.

The power supply side communication unit 130 includes an antenna for wireless communication and the like and communicates wirelessly with an external device (for example, the information processing server 300, the vehicle 200). For example, the power supply side communication unit 130 transmits and receives information and the like on power transmission from the power transmission device 110 to the vehicle 200. Specifically, the power supply side communication unit 130 transmits and receives information for pairing with the vehicle 200 side so that power is supplied to a specific vehicle 200 under the control of the power transmission side control unit 118 and the communication control unit 120, and transmits and receives information for adjusting the transmitted power amount. Further, the power supply side communication unit 130 may acquire information from another external device via the network NW.

[Vehicle]

Figure 3:
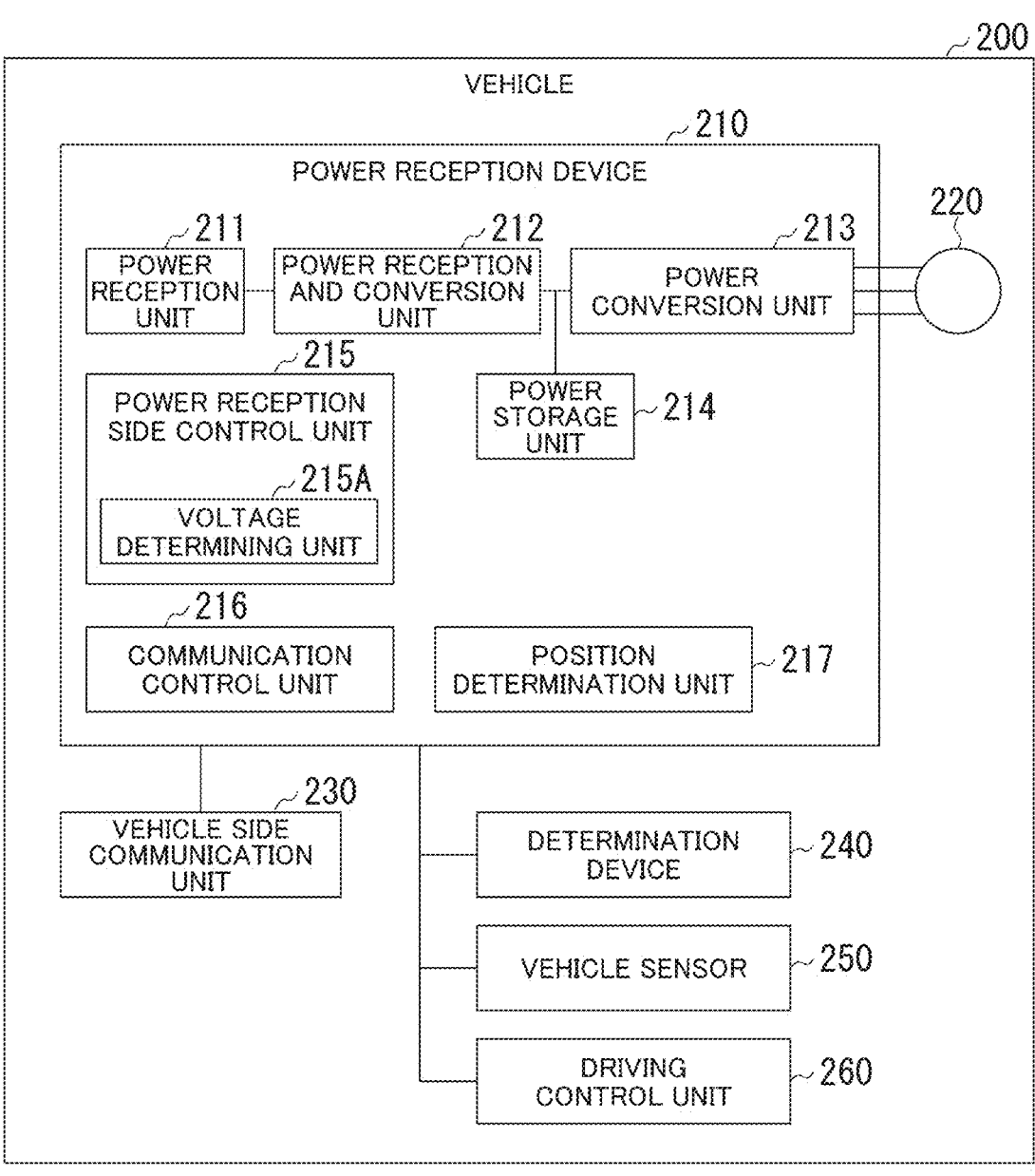
FIG. 3 is a diagram showing an example of the configuration of a vehicle of the embodiment.

FIG. 3 is a diagram showing an example of a configuration of the vehicle 200 of the embodiment. The vehicle 200 includes, for example, a power reception device 210, a rotating electric machine 220, a vehicle side communication unit 230, a determination device 240, a vehicle sensor 250, and a driving control unit 260. Although not shown in FIG. 1, the vehicle 200 includes, in addition to the above-described on-board devices, for example, various on-board devices (examples of loads and accessories) such as various devices (driving control devices, and the like) for traveling on roads by manual driving by a driver or automatic driving, a car navigation device, and an audio device. The power reception device 210 includes, for example, the power reception unit 211, the power reception and conversion unit 212, a power conversion unit 213, a power storage unit 214, a power reception side control unit 215, a communication control unit 216, and a position determination unit 217. The power reception side control unit 215 includes, for example, a voltage determining unit 215A. A part or all of the power reception side control unit 215, the communication control unit 216, and the position determination unit 217 are realized by, for example, a hardware processor such as a CPU executing a program (software). A part or all of these components may be realized by hardware (including circuitry) such as an LSI, ASIC, FPGA, or GPU, or may be realized by a combination of software and hardware. The program may be stored in advance in a storage device (a storage device having a non-transient storage medium) such as an HDD or flash memory of the vehicle 200 or the power reception device 210, or may be stored in a removable storage medium such as a DVD or CD-ROM, and installed in the HDD or flash memory of the vehicle 200 or the power reception device 210 by attaching the storage medium (non-transient storage medium) to a drive device.

The power reception unit 211 of the power reception device 210 is connected to the power reception and conversion unit 212. The power reception unit 211 receives power by changes in a high-frequency magnetic field transmitted from the power transmission unit 116, for example, due to magnetic field coupling such as magnetic field resonance or electromagnetic induction.

The power reception and conversion unit 212 is connected to the power conversion unit 213. The power reception and conversion unit 212 includes, for example, an inverter that converts AC power into DC power and smooths and divides the voltage. The inverter includes, for example, a bridge circuit formed by a plurality of switching elements and rectifying elements that are bridge-connected in two phases, a capacitor for smoothing voltage, and a voltage dividing circuit (an example of a voltage dividing unit) for dividing voltage. The circuit configuration of the power reception and conversion unit 212 will be described in detail later.

For example, the power reception device 210 which includes the power reception unit 211 and the power reception and conversion unit 212 receives power transmitted from the power transmission device 110 by controlling the on (conductive) and off (interrupted) switching of each switching element of the power reception and conversion unit 212 according to information on the frequency of power transmission by the power transmission device 110 under the control of the power reception side control unit 215.

The power conversion unit 213 is connected to the rotating electric machine 220. The power conversion unit 213 includes, for example, a power converter that converts between DC power and AC power. The power converter includes, for example, an element module and a capacitor for smoothing voltage. The circuit configuration of the power conversion unit 213 will be described in detail later.

The rotating electric machine 220 is, for example, a three-phase AC brushless DC motor provided for traveling and driving of a vehicle. The rotating electric machine 220 includes a rotor having a permanent magnet for a field, and a stator having a three-phase stator winding that generates a rotating magnetic field that rotates the rotor. The three-phase stator windings are connected to three-phase AC terminals of the power conversion unit 213. The rotating electric machine 220 generates a rotational driving force by performing a power running operation using the power supplied from the power conversion unit 213. For example, when the rotating electric machine 220 can be connected to the wheels of the vehicle 200, the rotating electric machine 220 generates a driving force for traveling the vehicle by performing a power running operation using the power supplied from the power conversion unit 213. The rotating electric machine 220 may generate power by performing a regenerative operation using rotational power input from the wheel side of the vehicle 200. If the rotating electric machine 220 can be connected to an internal combustion engine of the vehicle 200, the rotating electric machine 220 may generate electricity using the power of the internal combustion engine.

The power storage unit 214 includes, for example, a battery (an example of a secondary battery) such as a lithium-ion battery, a current sensor that determines the current of the battery, a voltage sensor that determines the voltage of the battery, and a temperature sensor that measures the temperature of the battery. In the vehicle 200, the power storage unit 214 is connected to the power conversion unit 213 and the power reception and conversion unit 212 to be described later. For example, under the control of the power reception side control unit 215, the power storage unit 214 stores power from the power supply device 100 or the rotating electric machine 220 and supplies the stored power to the rotating electric machine 220 and various other in-vehicle devices (loads, accessories).

The power reception side control unit 215 controls, for example, each function of the power reception device 210 or the entire vehicle 200 in an integrated manner. For example, the power reception side control unit 215 generates a control signal indicating the timing for driving each switching element to be on (conductive) and off (interrupted), and generates a gate signal for actually driving each switching element to ON and OFF based on the control signal. For example, the power reception side control unit 215 controls the switching of each switching element of the power reception device 210 and thereby corrects the power factors or the like of the input voltage and the input current while rectifying the AC power received from the power transmission device 110 into DC power.

Further, the power reception side control unit 215 generates predetermined information (for example, a pairing signal and information on power transmission) for transmitting power from the power supply device 100, and transmits the generated signal to the outside from the vehicle side communication unit 230. Furthermore, the power reception side control unit 215 may transmit a pairing signal at a predetermined cycle or at another predetermined timing. Further, when the power reception side control unit 215 receives permission information (pairing completion information) indicating that power can be supplied from the power supply device 100 side, information necessary for starting power transmission, and the like from the vehicle side communication unit 230, the target power is acquired by a synchronous rectification operation in which a plurality of switching elements of the power reception device 210 are synchronously turned on and off and a short-circuit operation in which a secondary side coil is short-circuited, which will be described later. Further, the power reception side control unit 215 controls the current of the power transmission device 110 to perform independent power control such as stopping of power transmission on the side of the power reception device 210.

The information on power transmission is, for example, information on the required power and required frequency for power transmission, the target output (power consumption) for fail-safe purposes, various abnormalities, and the like. The required power for power transmission is a target value of the power that the power reception device 210 receives from the power transmission device 110, and is set according to, for example, the target driving force of the vehicle 200 or the rotating electric machine 220, the power consumption of various auxiliary machines connected to the power storage unit 214, the power state (SOC: State Of Charge) of the power storage unit 214, and the like. The power state includes, for example, the remaining capacity, a charging rate, and the like of the power storage unit 214. The required frequency of power transmission is a frequency required for power transmission from the power transmission device 110 and is set according to the required power. The required frequency is set based on, for example, the minimum ground clearance of the vehicle 200 and the mounting layout of the power reception device 210 on the vehicle 200 so as to suppress a decrease in the power transmission efficiency and the output (power). The required frequency may be set according to, for example, the state of power transmission between the power transmission device 110 and the power reception device 210. Further, the information on power transmission may include information necessary for billing and settlement after use of the system.

Further, the power reception side control unit 215 controls the operation mode of the power reception device 210 according to the situation of the vehicle 200. As described above, the operation mode includes the short mode, the parameter transmission mode, the standby mode, and the power reception mode. For example, the power reception side control unit 215 transmits a pairing signal at a predetermined cycle of about several tens of us to several ms or the like, and when receiving a response signal to the pairing signal from the power supply device 100, the power reception side control unit 215 shifts the operation mode of the power reception device 210 from the off mode to the short mode and transmits information such as a required frequency. Furthermore, the power reception side control unit 215 shifts from the short mode to the power reception mode and starts power reception control for the power transmission from the power supply device 100 in the power transmission section. Further, when the power reception is completed, the power reception side control unit 215 shifts the operation mode of the power reception device 210 from the power reception mode to the off mode.

Further, the voltage determining unit 215A of the power reception side control unit 215 determines the voltage of the power reception and conversion unit 212. Further, predetermined information is acquired from the power supply device 100 based on the waveform of the determined voltage (for example, a square wave).

The communication control unit 216 controls the operation of the vehicle side communication unit 230. For example, the communication control unit 216 causes the vehicle side communication unit 230 to transmit predetermined information (for example, parameter information such as a pairing signal) at a timing such as a predetermined cycle. Further, the communication control unit 216 may transmit predetermined information when the position of the vehicle 200 is within a predetermined distance from the installation position of the power supply device 100 (power supply section) based on the position of the power supply device 100 determined by the position determination unit 217.

Then, when pairing is established, information on power transmission (for example, the required frequency, information required for billing and settlement after using the system, or the like) is transmitted to the vehicle side communication unit 230.

The position determination unit 217 determines the position of the power supply device 100 based on the surrounding situation of the vehicle 200 determined by the determination device 240, information on the vehicle 200 determined by the vehicle sensor 250, and the like.

The vehicle side communication unit 230 includes an antenna for wireless communication or the like and communicates wirelessly with external devices (for example, the information processing server 300 and the power supply device 100). For example, the vehicle side communication unit 230 transmits and receives information on power transmission from the power supply device 100. Specifically, the vehicle side communication unit 230 transmits and receives information for pairing with the side of the power supply device 100 so that power is supplied from a specific power supply device 100 under the control of the power reception side control unit 215, and transmits and receives information for adjusting the transmitted power amount or the like. Further, the vehicle side communication unit 230 may acquire information from other external devices via the network NW.

The determination device 240 corresponds to various devices that determine the surrounding situation of the vehicle 200 (within a predetermined distance from the vehicle 200). The determination device 240 includes, for example, a camera, a radar device, a light determination and ranging (LIDAR), a sensor fusion device, and the like. Further, the determination device 240 recognizes the type, shape, position (relative position), speed (relative speed), and the like of objects present in the vicinity based on the determination results. The objects include traffic participants such as other vehicles and pedestrians, as well as the traveling lane of the vehicle 200, road dividing lines that divide the lane, other road structures (road signs, median strips, curbs, traffic lights), and the like. Further, based on the position information of the vehicle 200 determined by the vehicle sensor 250, the determination device 240 may refer to map information or the like stored in a memory unit within the vehicle 200 and recognize the surrounding road shapes and the like (for example, the positions of road dividing lines), the power supply lane, the position of the power supply device 100, and the like from the position of the vehicle 200.

The vehicle sensor 250 includes, for example, a speed sensor that determines the speed V1 of the vehicle 200, an acceleration sensor that determines the acceleration, a yaw rate sensor that determines the yaw rate (angular velocity), a direction sensor that determines the direction of the front of the vehicle 200, an operation amount determination sensor attached to a driving operator, and the like. Examples of the driving operator include, for example, an operator for instructing acceleration/deceleration (such as an accelerator pedal and a brake pedal) and an operator for instructing steering (such as a steering wheel). In this case, the vehicle sensor 250 may include an accelerator opening sensor, a brake depression sensor, a steering torque sensor, and the like. Further, the vehicle sensor 250 may be provided with a position sensor that determines the position of the vehicle 200. The position sensor is, for example, a sensor that acquires position information (longitude and latitude information) from a global positioning system (GPS) device. Further, the position sensor may be a sensor that acquires position information using a global navigation satellite system (GNSS) receiver.

The above-described position determination unit 217 determines the position of the power supply lane or the power supply device based on the determination result by the determination device 240. For example, the position determination unit 217 analyzes the surrounding image of the vehicle 200 captured by the camera using a known image analysis process, and determines the position of the power supply lane and the position of the power supply device 100 from road signs and characters and marks drawn on the road and the like. Further, when the position determination unit 217 acquires the position information of the vehicle using a position sensor or the like mounted on the vehicle 200, the position determination unit 217 acquires the installation position of the power supply device 100 (or power supply section information) by referring to map information previously stored in a memory unit or the like.

The driving control unit 260 controls at least one of the steering and the speed of the vehicle 200 based on the surrounding situation determined by the determination device 240 and the information determined by the vehicle sensor 250 and the like, and performs driving control. The driving control includes, for example, lane keeping assistance system (LKAS) control (lane keeping control) that performs steering control so that the vehicle 200 travels in the center of the traveling lane (travel path) (in other words, so as not to deviate from the road dividing lines that divide the traveling lane). Further, the driving control includes adaptive cruise control (ACC), which drives the vehicle 200 at a constant speed set in advance and automatically accelerates or decelerates when approaching a preceding vehicle by measuring the distance and speed difference between the preceding vehicle and the vehicle, and auto lane changing (ALC) control, which executes lane change (steering control) in the instructed direction when an instruction to change lanes of the vehicle 200 is received by the driver operating the turn signal switch.

[Circuit Configuration on Power Transmission Side and Power Reception Side]

Figure 4:
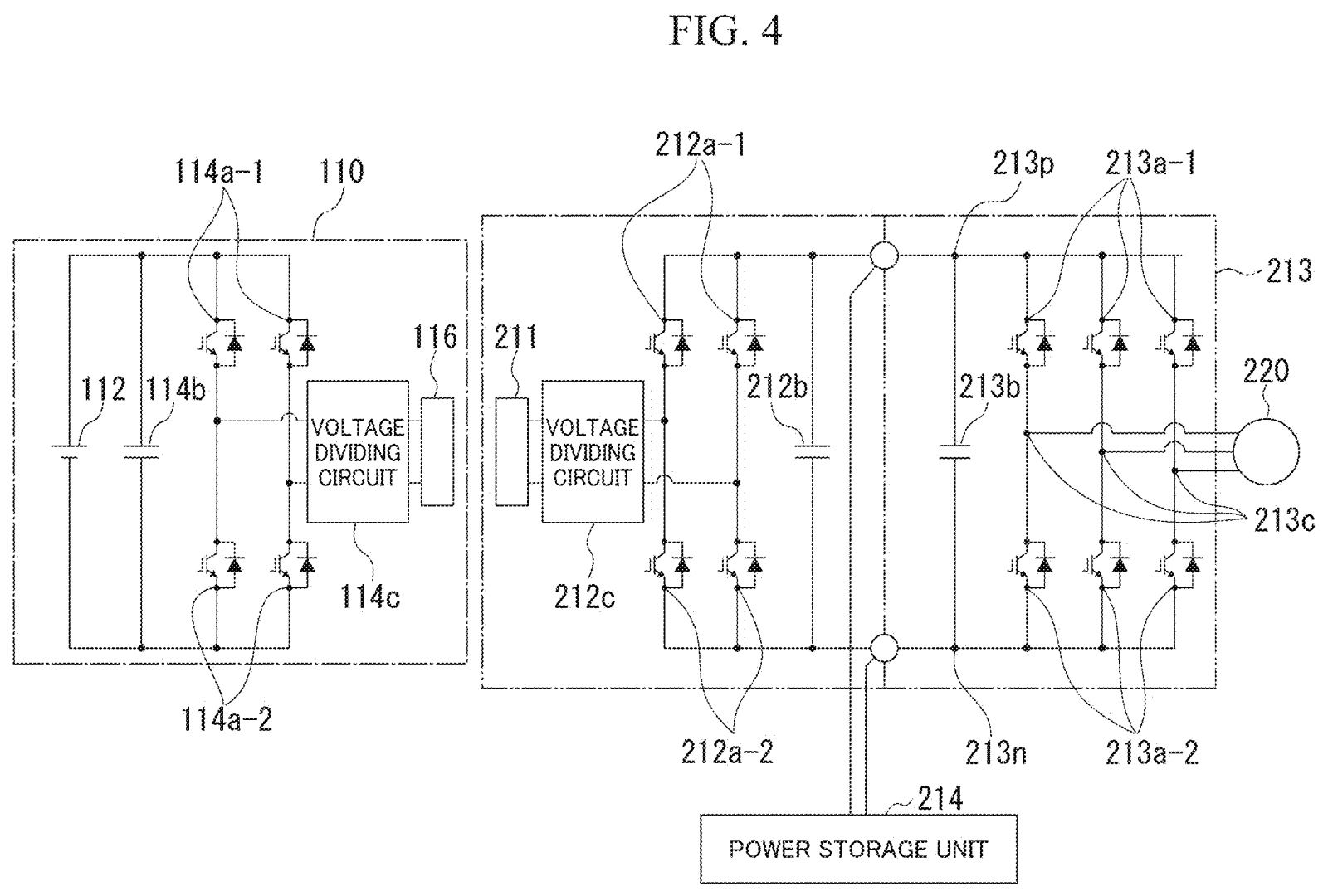

Next, an example of a circuit configuration of the power transmission side by the power transmission device 110 and the power reception side by the power reception device 210 in the embodiment will be described. FIG. 4 is a diagram illustrating an example of a circuit configuration on the power transmission side and the power reception side of the embodiment. Furthermore, in the example of FIG. 4, mainly, the circuit configuration of the power transmission and conversion unit 114 in the power transmission device 110 and the circuit configurations of the power reception and conversion unit 212 and the power conversion unit 213 in the power reception device 210 are specifically shown.

The power transmission and conversion unit 114 includes an inverter that converts DC power into AC power. The inverter of the power transmission and conversion unit 114 includes, for example, a bridge circuit 114a formed by a plurality of switching elements and rectifying elements that are bridge-connected in two phases, a voltage smoothing capacitor 114b, and a voltage dividing circuit 114c. Each switching element is, for example, a silicon carbide (SiC) transistor. The plurality of switching elements are high-side arm and low-side arm transistors 114a-1 and 114a-2 that form a pair for each phase. The rectifying elements are, for example, reflux diodes connected in parallel to the transistors 114a-1 and 114a-2. The voltage smoothing capacitor 114b is connected in parallel to the bridge circuit. The voltage dividing circuit 114c has, for example, one or more resistor elements connected in series or parallel on each of the positive terminal side and the negative terminal side, and divides and drops the voltage in the power transmission and conversion unit 114 by these resistor elements.

For example, the power transmission side control unit 118 transmits power from the power transmission device 110 via the power transmission unit 116 by controlling the on (conductive) and off (interrupted) switching of each switching element of the power transmission and conversion unit 114 according to the frequency required by the power reception device 210. Further, the power transmission side control unit 118 can generate a desired voltage waveform (for example, a rectangular waveform) on the power transmission side by controlling the resistor element that is made conductive by the switch for the voltage dividing circuit 114c. For example, the power transmission side control unit 118 can acquire information from the voltage generated by the received signal by determining the voltage and the like of this waveform using the voltage determining unit 118A and generating a bit string signal consisting of 0 and 1 based on the determination result.

The power reception and conversion unit 212 includes, for example, a bridge circuit 212a formed by a plurality of switching elements and rectifying elements that are bridge-connected in two phases, a voltage smoothing capacitor 212b, and a voltage dividing circuit 212c. Each switching element is, for example, a SiC transistor. The plurality of switching elements are high-side arm and low-side arm transistors 212a-1 and 212a-2 that form a pair in each phase. The rectifying elements are, for example, reflux diodes connected in parallel to the transistors 212a-1 and 212a-2. The voltage smoothing capacitor 212b is connected in parallel to the bridge circuit. The voltage dividing circuit 212c has, for example, one or more resistor elements connected in series or parallel on each of the positive terminal side and the negative terminal side, and divides and drops the voltage in the power reception and conversion unit 212 by these resistor elements.

Further, the power conversion unit 213 includes, for example, a second element module 213a and a voltage smoothing capacitor 213b. The second element module 213a includes, for example, a second bridge circuit formed by a plurality of switching elements and rectifying elements that are bridge-connected in three phases. Each switching element is, for example, a SiC transistor. The plurality of switching elements are high-side arm and low-side arm transistors 213a-1 and 213a-2 that form a pair in each phase. The rectifying elements are, for example, free wheel diodes connected in parallel to the transistors 213a-1 and 213a-2. The voltage smoothing capacitor 213b is connected in parallel to the second bridge circuit.

The second element module 213a controls the operation of the rotating electric machine 220 by receiving and transmitting power. For example, when the rotating electric machine 220 is powered, the second element module 213a converts the DC power input from the positive and negative DC terminals 213p and 213n into three-phase AC power and supplies the three-phase AC power to the rotating electric machine 220 from the three-phase AC terminals 213c. The second element module 213a generates a rotational driving force by sequentially commutating the current to the three-phase stator windings of the rotating electric machine 220. For example, during regeneration of the rotating electric machine 220, the second element module 213a converts three-phase AC power input from the three-phase stator windings into DC power by driving the switching elements of each phase to be on (conductive) and off (interrupted) in synchronization with the rotation of the rotating electric machine 220. The second element module 213a is capable of supplying the power storage unit 214 with DC power converted from three-phase AC power.

For example, the power reception side control unit 215 receives power transmitted from the power transmission device 110 via the reception unit 211 by controlling the on (conductive) and off (interrupted) switching of each switching element of the power reception and conversion unit 212 according to the required frequency. Further, the power reception side control unit 215 can generate a desired voltage waveform (for example, a rectangular waveform) on the power reception side by controlling the resistor element that is made conductive by the switch for the voltage dividing circuit 212c. For example, the power reception side control unit 215 can acquire information from the voltage and the like generated by the received signal by determining the voltage of this waveform using the voltage determining unit 215A and generating a bit string signal consisting of 0 and 1 based on the determination result.

Figure 5:
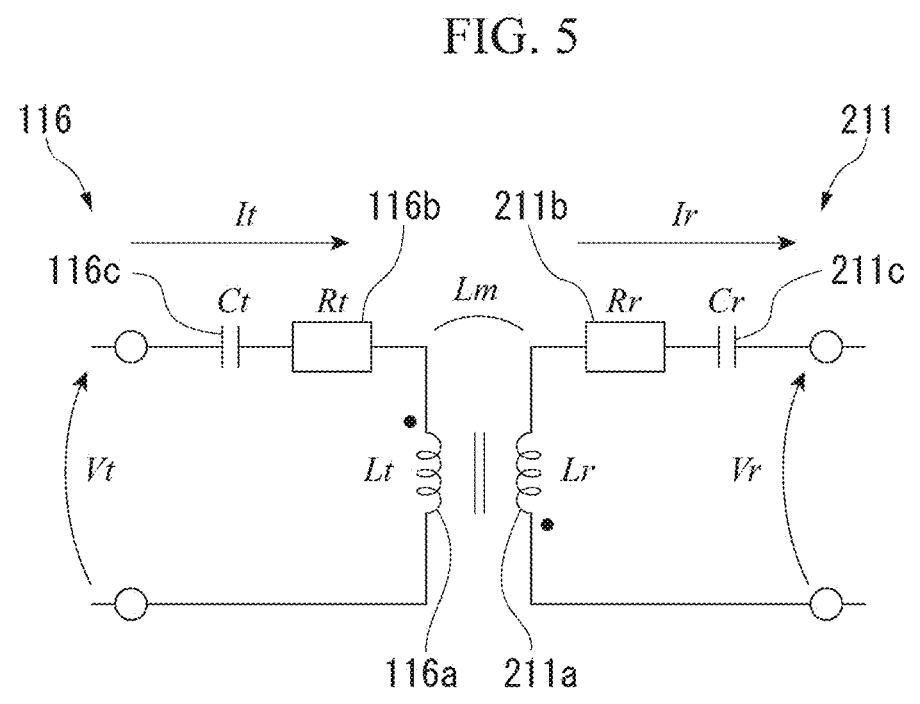

FIG. 5 is a diagram showing an example of a circuit configuration of the power transmission unit 116 and the power reception unit 211. The power transmission unit 116 includes, for example, a resonant circuit formed by a primary side coil (Lt) 116a, a primary side resistor (Rt) 116b, and a primary side capacitor (resonant capacitor, Ct) 116c that are connected in series. The voltage determining unit 118A may determine the voltage Vt flowing through the resonant circuit.

Further, the power transmission device 110 may include a current determination unit that determines a current (power transmission side current) It flowing through the resonant circuit.

The power transmission device 110 may include various sensors such as voltage sensors.

The power reception unit 211 includes, for example, a resonant circuit formed by a secondary side coil (Lr) 211$a$, a secondary side resistor (Rr) 211$b$, and a secondary side capacitor (resonant capacitor, Cr) 211$c$ that are connected in series. The primary side capacitor 116$c$ and the secondary side capacitor 211$c$ are, for example, capacitors for magnetic field resonance. The voltage determining unit 215A may determine the voltage Vr flowing in the resonant circuit. Further, the power reception device 210 may include a current determination unit that determines a current (power reception side current) Ir flowing through the resonant circuit.

[Transmission and Reception of Information by Power Transmission Device 110 and Power Reception Device 210]

Here, in the embodiment, as described above, since the power transmission and conversion unit 114 which is an inverter on the power transmission side and the power reception and conversion unit 212 which is an inverter on the power reception side are respectively provided with the voltage dividing circuits 114$c$ and 212$c$ and the voltage determining units 118A and 215A to convert a voltage value of the divided voltage waveform into bit string information of 0 and 1, communication using the power transmission device 110 and the power reception device 210 is enabled, and power consumption due to communication between the power supply side communication unit 130 and the vehicle side communication unit 230 is reduced. Furthermore, the following description will mainly focus on the case where information is transmitted from the power reception device 210 to the power supply device 100 (power transmission device 110), but in this embodiment, information can also be transmitted from the power supply device 100 to the power reception device 210 by applying the control described below.

In the embodiment, in the power supply device 100, the power transmission unit 116 divides the voltage excited by magnetic field coupling based on the voltage waveform signal of the power reception side in the voltage dividing circuit 114$c$, and acquires a voltage waveform from the divided voltage. Furthermore, the power transmission side control unit 118 converts the voltage waveform into a rectangular wave using the voltage divided by the voltage dividing circuit 114$c$, and acquires information of the bit string. Furthermore, in the embodiment, voltage excitation occurs with a duty ratio (for example, the percentage of time during which the voltage is on (above a predetermined value) in a predetermined period) of the voltage waveform (rectangular wave) of 50%, but the waveform can be adjusted according to voltage control by the power reception side control unit 215.

The power transmission side control unit 118 acquires bit string information of 0 and 1, with a low voltage (minimum value) of the voltage waveform being "0" and a high voltage (maximum value) being "1". By performing voltage control in the embodiment, voltage excitation can be more reliably generated through smooth magnetic field coupling, and information can be acquired from a rectangular voltage waveform.

Further, the power reception side control unit 215 performs the voltage control described above so that the phase shift amount of the signal from the power reception device 210 is smaller than a threshold value. The threshold value is, for example, a duty ratio (on state) of 50%. The power reception side control unit 215 performs control so that the voltage is in the on state within a range larger than 0% and smaller than 50% in a predetermined cycle. In this way, it is possible to reduce power consumption on the side of the vehicle 200 by reducing the time during which the voltage is high (on state).

[Transition of Operation Mode in Non-Contact Power Supply]

Figure 6:
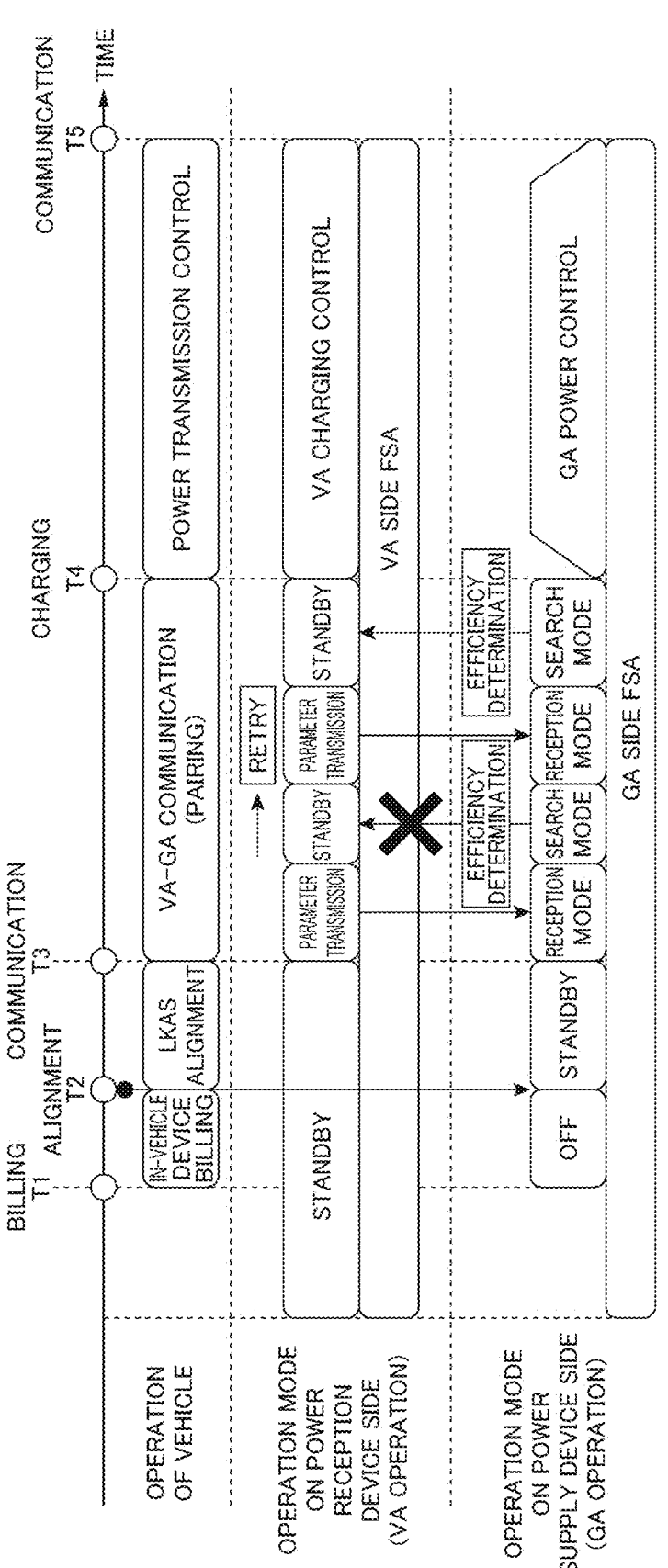
FIG. 6 is a diagram illustrating a transition of an operation mode.

Next, the transition of the operation mode of the power transmission device 110 and the power reception device 210 in the non-contact power supply will be described with reference to the drawings. FIG. 6 is a diagram illustrating the transition of the operation modes. In the example of FIG. 6, the horizontal axis indicates time, and the vertical axis indicates the operation of the vehicle 200, the operation mode (VA operation) on the side of the power reception device 210, and the operation mode (GA operation) on the power supply device 100. Furthermore, the operation transition in FIG. 6 shows an example in which non-contact power transmission is performed between the power supply device 100 and the power reception device 210 while the vehicle 200 is traveling at a predetermined speed (for example, about 80 km/h) as an example. Hereinafter, the transition in operation over time will be described. In the example of FIG. 6, in the non-contact power supply, a FSA (Fail-Safe Action) is performed in which abnormality detection is constantly performed at the power reception device 210 side and the power supply device 100 side, and a control to the safe side is performed when an abnormality is detected (VA side FSA, GA side FSA).

At time T1, the power reception side control unit 215 of the vehicle 200 communicates with, for example, the information processing server 300 and the like via the vehicle side communication unit 230, and performs a billing process for non-contact power supply or a pre-process for billing corresponding to the supplied power amount (in-vehicle device billing). Furthermore, prior to time T1, the operation mode of the power reception device 210 is the standby mode. During the billing process, the operation mode of the power supply device is the off mode.

At time T2, after the billing process is completed, the vehicle 200 is aligned so that the power reception device 210 passes over the power supply device 100 installed on the road surface of the road (for example, a power supply lane). In this case, the alignment may be performed by the driving control unit 260 based on information determined by the position determination unit 217, or an image showing the position of the power supply device 100 (or the position of the power supply lane) and the current position of the vehicle 200 may be displayed on a display unit (not shown) mounted on the vehicle 200 so that the driver may perform the alignment by manual driving while watching the image displayed on the display unit. For example, when the LKAS control is being performed by the driving control unit 260, the vehicle 200 is controlled to travel in the center of the lane, so that the vehicle 200 can be consequently aligned by traveling on the power supply lane through the LKAS control. Furthermore, during the period from time T2 to time T3, the power reception device 210 remains in the short mode, and the power supply device 100 shifts from the off mode to the standby (waiting) mode.

At time T3, when the distance between the power reception device 210 and the power supply device 100 becomes within a predetermined distance (a distance at which communication is possible) due to the traveling of the vehicle 200, the power reception side control unit 215 of the vehicle 200 starts pairing between the power reception device 210 and the power supply device 100 through communication (VA-GA communication). Between times T3 and T4, the power reception side control unit 215 alternates between the transmission mode in which parameter information (ID, required power, battery voltage, etc.) is transmitted and the standby mode until the power transmission efficiency becomes larger than a predetermined value (for example, larger than 0 [%]). Meanwhile, the power transmission side control unit 118 of the power supply device 100 alternates between the reception mode and the search mode. In the search mode, for example, for correspondence information of the power (transmission power) and the efficiency of power transmission according to the horizontal distance (the relative moving amount between the primary side coil and the secondary side coil in the direction parallel to the road surface) in the non-contact power transmission system 1 of the embodiment set in advance, the efficiency is acquired from the correspondence information for the power obtained by the voltage value and the current value. Further, the power transmission side control unit 118 determines the efficiency based on the ratio of the voltage and the current. Then, if the efficiency is equal to or smaller than a predetermined value, the power transmission side control unit outputs that information to the power reception device 210 to perform a retry operation. That is, in this embodiment, when the transmission efficiency is not suitable for supplying power, the above-described pairing-related communication can be performed. For example, when the vehicle 200 is traveling at a speed of 80 km/h, the expected period from time T3 to time T4 (expected communication completion time) is approximately 22.5 msec.

Since the power transmission efficiency becomes larger than a predetermined value at time T4, power transmission control is performed. For example, the power supply device 100 performs power control (GA power control) to transmit power corresponding to the required power specified by the parameters to the outside. Further, in the power reception device 210, the power transmitted from the power supply device 100 is received and power control (VA charging (power reception) control) is performed to store power in the power storage unit 214 mounted in the vehicle 200. That is, the power supply device 100 communicates (performs pairing communication) with the power reception device 210 when the power transmission efficiency with the power reception device 210 is equal to or smaller than a predetermined value, and performs power supply control for the power reception device 210 when the efficiency becomes larger than the predetermined value. Accordingly, pairing communication can be completed in a state where the power transmission efficiency is not good, and power can be supplied more efficiently in a state where the power transmission efficiency is good.

Since the power transmission efficiency becomes smaller than the predetermined value at time T5, the power supply operation is ended at this time. Accordingly, power supply control can be performed using efficient power transmission. For example, when the vehicle 200 is traveling at 80 km/h, the expected period from time T4 to time T5 (expected power transmission time) is about 18 msec. Furthermore, since the plurality of power supply devices 100 are installed at predetermined intervals on the power supply lane, the vehicle 200 can be charged up to the required power by each power supply device 100 performing the control as shown in FIG. 6. Furthermore, when the power supply is completed, the used power amount up to that point is accumulated, and a billing process (accounting process) or the like for that amount is performed.

Figure 7:
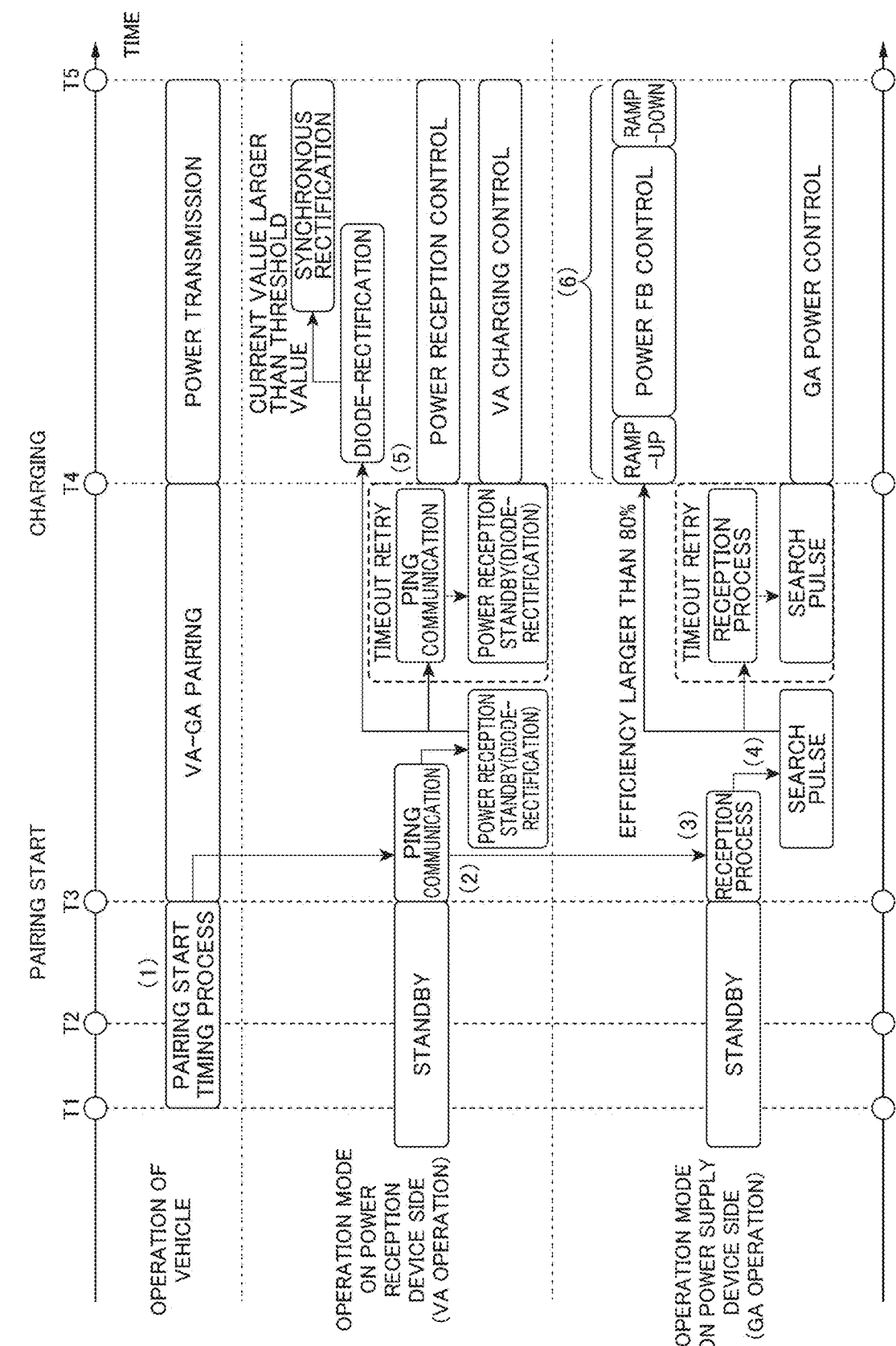
FIG. 7 is a diagram illustrating details of pairing and power transmission processes.

Next, details of the pairing and power transmission processes from time T3 to time T5 described with reference to FIG. 6 will be described. FIG. 7 is a diagram illustrating details of the pairing and power transmission processes. Between times T1 and T3, the vehicle 200 controls the timing at which the power reception device 210 of the vehicle 200 communicates with the power supply device 100 by cooperative control using a camera or other in-vehicle devices as a pairing start timing process ((1) in the figure).

At time T3, the power reception device 210 of the vehicle 200 performs PING communication with the power supply device 100 ((2) in the figure). In this case, the transmission method uses magnetic field coupling. More specifically, a weak magnetic field coupling method using the power transmission frequency is used. For example, when a magnetic field is generated by the secondary side coil of the power reception device 210 during PING transmission, communication from the power reception device 210 is determined by a voltage induced in the primary side coil of the power transmission device 110. The power transmission side control unit 118 acquires information superimposed on the PING signal by demodulating the voltage determined when the PING is transmitted. Further, as described above, if the power transmission efficiency does not exceed a predetermined value (80%), a retry process is performed a predetermined number of times. Further, the transmitted signal includes, for example, identification information (vehicle ID) for identifying the vehicle 200, required power, battery voltage, and the like. By limiting the information required for pairing to the minimum information, such as the vehicle ID, required power, and battery voltage, it is possible to appropriately identify the vehicle and achieve appropriate power control. Here, the required power may be the maximum chargeable power, and may be a different value when the vehicle 200 is moving and when the vehicle is stopped. Further, until time T4 when charging starts (until the current value becomes larger than the threshold value), PING communication and standby mode (reception standby) are repeated at predetermined timings (timeout retry). Furthermore, even in the standby mode, it is determined whether the diode-rectified current value is larger than the threshold value.

In the power supply device 100, the power supply side communication unit 130 receives a signal transmitted from the power reception device 210 via PING communication, and the power transmission side control unit 118 acquires the voltage value, current value, and the like from the received signal, and acquires the power transmission efficiency from the acquired peak-to-peak (P-P) voltage, current ratio, and the like (in the FIG. 3)). Next, the power transmission side control unit 118 performs a search pulse process (search mode) to determine whether the power efficiency is larger than 80% with the duty and phase shift being limited ((4) in the figure). Furthermore, the power supply device 100 repeatedly performs the reception process and the search pulse process at a predetermined timing (timeout retry) until the power efficiency becomes larger than 80%.

At time T4, when the current value becomes larger than the threshold value, the power reception device 210 performs power reception control ((5) in the figure). In this case, the power reception device 210 receives power efficiently through a synchronous rectification operation. For example, the power reception side control unit 215 controls the output according to the target output by a synchronous rectification operation that drives a plurality of switching elements of the power reception device 210 to be synchronously turned on and off and a short-circuit operation that short-circuits the secondary side coil. For example, the power reception side control unit 215 controls the synchronous rectification operation according to the magnitude and phase of a current generated in the power reception device 210 by the power transmitted from the power transmission device 110, that is, a current Ir flowing through the secondary side coil. The power reception side control unit 215 controls a plurality of switching elements of the power reception and conversion unit 212 by so-called zero voltage switching (ZVS) soft switching. In zero voltage switching (ZVS), the voltage across each switching element is made zero by discharging the output capacitance (parasitic capacitance) in the off state during the dead time period of each phase, and then the switching element is turned on (switched from the off state to the on state). For example, the power reception side control unit 215 controls the short-circuit operation by turning on only the low-side arm of each phase while continuing the synchronous rectification operation of zero voltage switching (ZVS) in the high-side arm of each phase of the power reception and conversion unit 212. The power reception side control unit 215 restricts the primary side current (power transmission side current: current flowing through the primary side coil) by short-circuiting the secondary side coil to increase the impedance of the secondary side when the secondary side power reception device 210 is seen from the primary side power transmission device 110. A power reception side control device 17 performs independent power control such as stopping power transmission on the side of the power reception device 210 by controlling the current of the primary side power transmission device 110 by the secondary side power reception device 210. Further, when an abnormality or the like occurs, the power reception device 210 may perform a safe side control (FSA).

Further, at time T4, when the efficiency is larger than 80%, the power supply device 100 performs ramp-up control for gradually increasing the power, power feedback (FB) control, and ramp-down control for gradually decreasing the power ((6) in the figure). Furthermore, the ramp-up control and ramp-down control are performed at high speed with little noise so as to be able to handle even a case where the vehicle 200 passes by at 100 km/h, for example.

Figure 8:
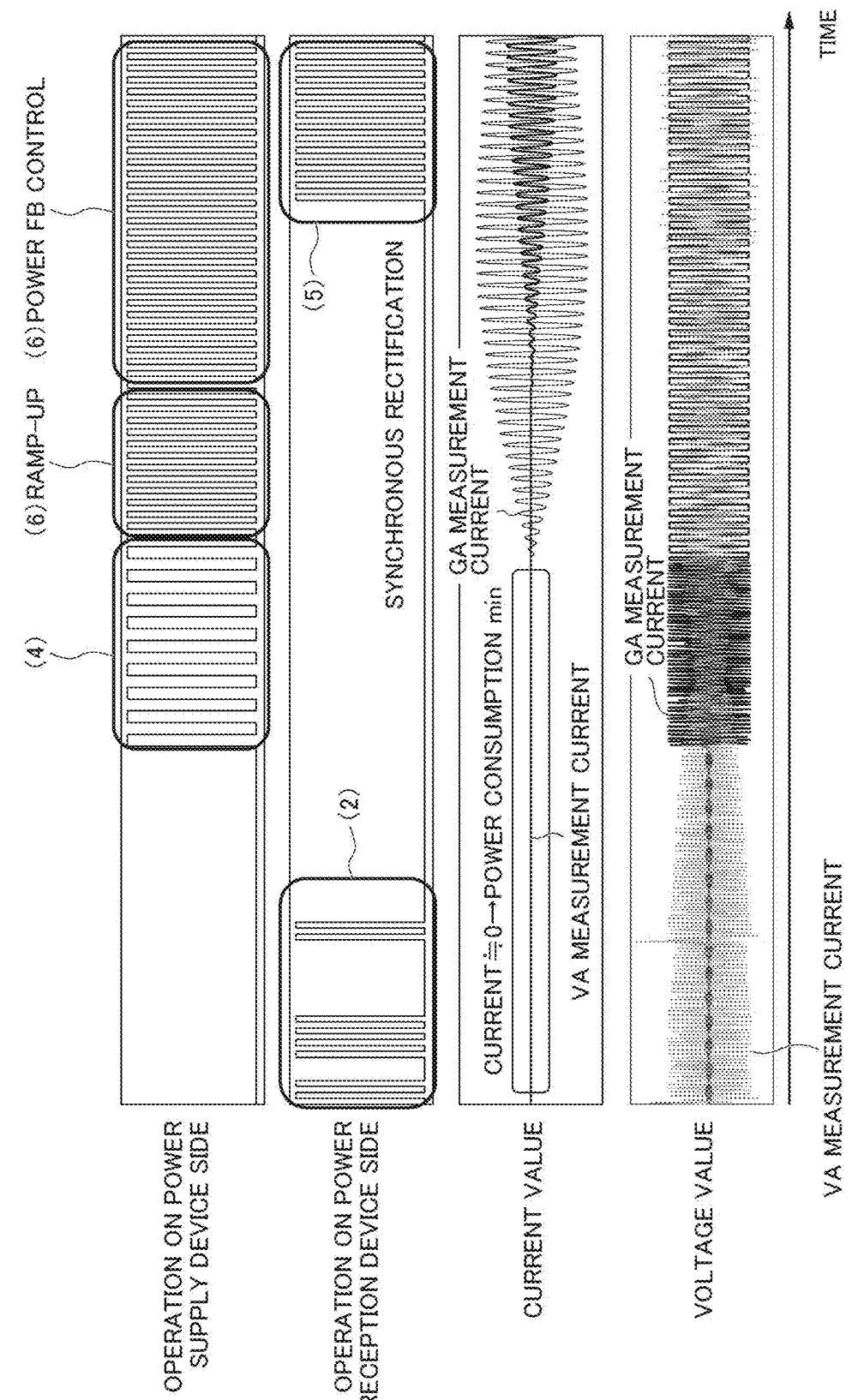
FIG. 8 is a diagram illustrating transitions of current and voltage values on a power reception device side and a power supply device side.

Next, the transition of the current value and the voltage value corresponding to the situation on the side of the power reception device 210 and the power supply device 100 will be described with reference to the drawings. FIG. 8 is a diagram illustrating transitions of current values and voltage values on the power reception device side and the power supply device side. In the example of FIG. 8, the horizontal axis indicates time, and the vertical axis indicates signals due to the operations of the power supply device (GA) and the power reception device (VA), and measured current values and measured voltage values corresponding to each operation. Furthermore, in the example of FIG. 8, the operation on the side of the power supply device 100 is shown as a search pulse process (search mode) (4) shown in FIG. 7 and a ramp-up process and power FB control (6) shown in FIG. 7, and in the control on the side of the power reception device 210, PING communication (2) shown in FIG. 7 and synchronous rectification (5) shown in FIG. 7 are shown.

At the time when the PING signal is transmitted on the side of the power reception device 210 (VA side), the measured current value is small ($\approx 0$) and the power consumption is at a minimum (min). Further, when the power supply device 100 also performs the search mode, the measurement voltage (GA measurement voltage) increases on the side of the power supply device 100. Further, in the example of FIG. 8, the measurement voltage (VA measurement voltage) on the side of the power reception device 210 decreases at the timing when the GA measurement voltage increases. Here, when the power efficiency becomes larger than a predetermined value, the measurement current (GA measurement current) on the side of the power supply device 100 increases due to a ramp-up operation, and the VA measurement current increases based on synchronous rectification while performing power FB control and the like. Accordingly, the power reception (charging) control on the side of the power reception device 210 is performed.

Furthermore, in the above-described process, the case in which the vehicle 200 is traveling at high speed (for example, 80 km/h) is shown, but similar control may be applied when traveling at low speed or when stopped. That is, the process of this embodiment is widely applicable when the speed V1 of the vehicle 200 is in the range of 0 to 100 km/h, for example. With respect to the power supply when the vehicle is stopped, power control is performed by taking into consideration a time rating of, for example, 1, 3, or 10 seconds or the like that is set in advance.

[Process Flow]

Figure 9:
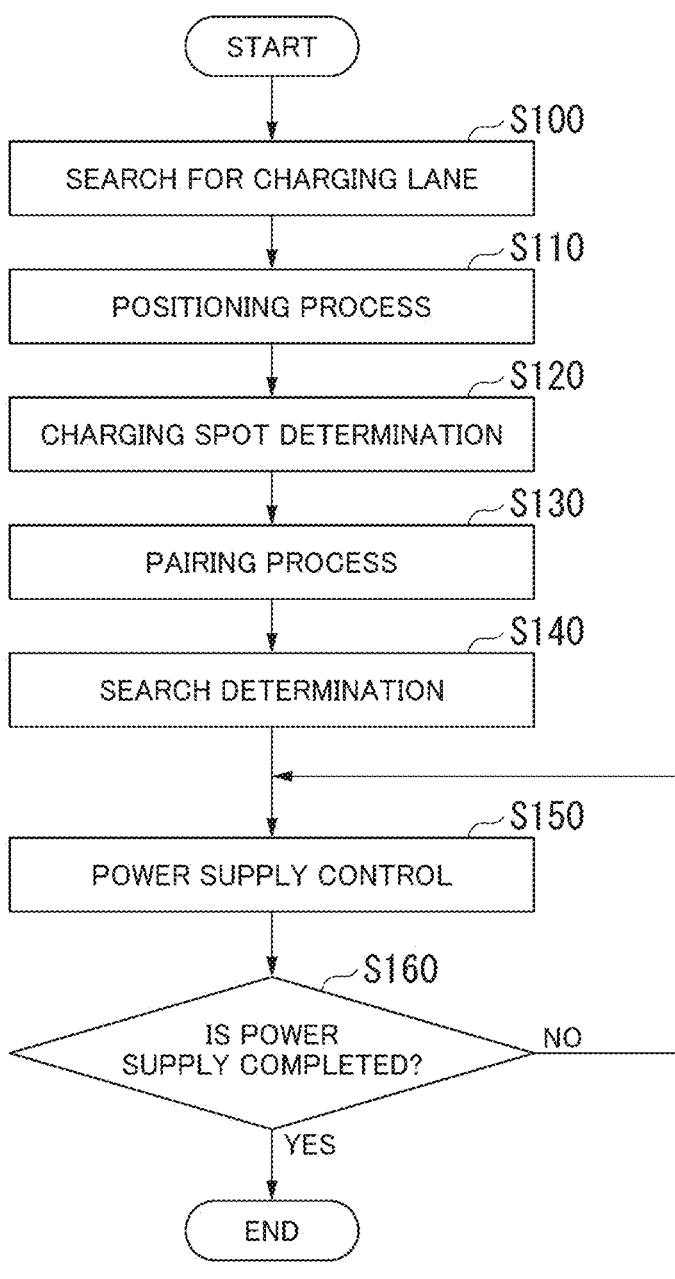
FIG. 9 is a flowchart showing an example of a power transmission control in the embodiment.

Next, a flow of a power transmission process in the embodiment will be described. Furthermore, in the following processes, a non-contact power transmission process in the entire system between the vehicle 200 (power reception device 210) and the power transmission device 110 will be mainly described among the processes in the non-contact power transmission system 1. FIG. 9 is a flowchart showing an example of power transmission control of the embodiment. In the example of FIG. 9, the vehicle 200 searches for the position of the charging lane based on the determination result of the determination device 240 such as a camera (step S100). In the process of step S100, for example, the camera image captured by the camera is analyzed using a known image analysis process, and the position of the power supply lane is acquired from the position of a road sign or text information indicating the position of the power supply lane (or the power supply device 100) contained in the camera image. Further, in the process of step S100, the vehicle 200 may refer to map information based on the position information of the vehicle 200 obtained from the vehicle sensor 250, and may acquire the positions of the power supply lanes present around the vehicle 200 from the information of the power supply lanes included in the map information. Furthermore, when the driver of the vehicle 200 visually finds the position of the power supply lane from road signs or text information and manually drives a vehicle 200M into the power supply lane, the process of step S100 may be omitted.

Next, the vehicle 200 performs a positioning process (step S110). In the process of step S110, for example, the driving control unit 260 can perform LKAS control to position the vehicle 200 so that the vehicle travels in the center of the lane. For example, since the power supply device 100 is installed in the center of the lane and the power reception device 210 is installed in the center (near the middle) of the width direction of the vehicle 200, it is possible to position the vehicle 200 in a more appropriate position for non-contact power supply by performing LKAS control as a result.

Next, the vehicle 200 determines a charging spot in a charging lane (step S120). The charging spot is a position where the power supply device 100 is installed. The position of the power supply device 100 may be determined from a camera image or from map information. Alternatively, the next position of the power supply device 100 installed at a predetermined interval may be determined based on the position and speed of the vehicle 200. Next, the vehicle 200 performs a pairing process between the power supply device 100 and the vehicle 200 (or the power reception device 210) by PING communication using weak electrostatic coupling (step S130). After the pairing is completed, the power supply device 100 performs a search determination in a search mode and determines whether the power transmission efficiency is larger than a predetermined value (step S140). When the efficiency becomes larger than a predetermined value, non-contact power supply control is performed (step S150). Furthermore, if an abnormality or the like occurs in the power supply control, the FSA control or the like may be performed.

Next, the vehicle 200 determines whether or not to complete the power supply (step S160). For example, when power supply according to the required amount is completed, it is determined that power supply is completed. Further, it may also be determined that power supply is completed when the power transmission efficiency falls below a predetermined value. If it is determined that the power supply is not to be completed, the process returns to step S150 to continue the power supply control, and if it is determined that the power supply is to be completed, the process of this flowchart ends. Furthermore, in the process of FIG. 9, a billing process or the like may be performed after the power supply is completed.

According to the above-described embodiment, in the non-contact power transmission system 1 for supplying power in a non-contact state from the power supply device 100 provided in the road (an example of the moving path) of the vehicle 200 (an example of the moving body) to the power reception device 210 provided in the vehicle 200, the power reception device 210 includes the position determination unit 217 which determines the position of the power supply device 100 and the power reception side control unit 215 which performs pairing due to magnetic field coupling with the power supply device determined by the position determination unit 217 and performs power reception control based on the power obtained from the paired power supply device, and the power supply device 100 includes the power transmission side control unit 118 (an example of the power transmission side control unit) which supplies power corresponding to the required power from the paired power reception device to the power reception device. Accordingly, more appropriate power transmission to a moving body can be performed.

For example, in the embodiment, the voltage dividing circuit and the voltage determining unit are set for each of the power supply device 100 and the power reception device 210. Further, the vehicle side prevents unintended power transmission by using a short mode. Further, in the embodiment, for example, when approaching a position where the power supply device is present, a pairing signal is transmitted, the determination side generates a voltage excitation according to the supply voltage, and the communication transmission side performs switching at 79 to 90 kHz and performs a phase shift within a duty ratio range of 0 to 50% to achieve the minimum output. In this way, power consumption can be reduced by transmitting power with a phase shift. Further, according to this embodiment, since there is no need to search for charging spots through, for example, communication using Wi-Fi or the like, the system can be applied not only when the vehicle is stopped but also when driving at high speed.

Further, according to this embodiment, for example, power can be transmitted only when the power transmission efficiency is larger than a specified value (for example, the total efficiency of the inverter coil=80%). Further, according to this embodiment, since the communication peak value can be determined according to the vehicle voltage on the VA side, a determination circuit unit according to the vehicle 200 can be set, and a peak value according to the supply voltage can be determined on the GA side regardless of the vehicle voltage.

Further, according to this embodiment, since the pairing process is performed by a weak magnetic field coupling method using the power transmission frequency, communication is possible even when the speed V1 of the vehicle 200 is high (approximately 100 km/h). By completing pairing using communication in a state where the power transmission efficiency is low before the efficiency exceeds a predetermined value, more efficient power transmission can be performed when the efficiency exceeds the predetermined value. Further, according to this embodiment, since the information required for pairing is the minimum information of the required power, the battery voltage, and the vehicle ID, the vehicle can be identified and appropriate power control can be performed.

Further, in the embodiment, it is possible to appropriately identify the vehicle and achieve appropriate power control by limiting the information required for pairing to the minimum, such as vehicle ID, required power, and battery voltage. Further, according to this embodiment, it is possible to appropriately search for the start timing of power transmission by estimating the coupling state based on the search pulse that results in a small power.

The embodiments of the present invention are presented as examples and are not intended to limit the scope of the invention. These embodiments can be implemented in various other forms, and various omissions, substitutions, and modifications can be made without departing from the scope of the invention. These embodiments and their modifications are included in the scope of the invention and its equivalents as described in the claims, as well as in the scope and gist of the invention.

What is claimed is:

1. A non-contact power transmission system that supplies electric power in a non-contact state from a power supply device provided in a moving path of a moving body to a power reception device provided in the moving body,
   wherein the power reception device comprises: a position determination unit which determines a position of the power supply device; and a power reception side control unit which performs pairing by magnetic field coupling between the power reception device and the power supply device determined by the position determination unit and performs an electric power reception control based on electric power obtained from the paired power supply device, and
   wherein the power supply device comprises a power supply side control unit which supplies electric power corresponding to required electric power from the paired power reception device to the power reception device.

2. The non-contact power transmission system according to claim 1,
   wherein the power supply device comprises a power supply side communication unit which communicates with the power reception device using a voltage waveform generated by magnetic field coupling based on a signal from the power reception device.

3. The non-contact power transmission system according to claim 1, wherein each of the power supply device and the power reception device includes a voltage dividing unit which divides a voltage generated by a received signal, and wherein the power supply side control unit causes the voltage dividing unit to convert a waveform of the voltage into a rectangular wave and acquires bit string information.

4. The non-contact power transmission system according to claim 1, wherein the power reception side control unit controls a phase shift amount of a signal from the power reception device to be smaller than a threshold value.

5. The non-contact power transmission system according to claim 1, wherein the moving body comprises: a determination device which recognizes a surrounding situation; and a driving control unit which controls at least steering of a speed and the steering of the moving body based on an output of the determination device, and wherein the moving body is positioned at a position corresponding to the position of the power supply device determined by the position determination unit based on driving control performed by the driving control unit so that the moving body travels on a middle of the moving path.

6. The non-contact power transmission system according to claim 1, wherein the power supply device performs communication with the power reception device when an efficiency of power transmission with the power reception device is equal to or smaller than a predetermined value, and performs power supply control for the power reception device when the efficiency is larger than the predetermined value.

7. A non-contact power transmission method of supplying electric power in a non-contact state from a power supply device provided in a moving path of a moving body to a power reception device provided in the moving body, the non-contact power transmission method comprising:

by way of the power reception device, determining a position of the power supply device;

by way of the power reception device, performing pairing by weak magnetic field coupling between the power reception device and the determined power supply device;

by way of the power reception device, performing an electric power reception control based on electric power obtained from the paired power supply device; and by way of the power supply device, supplying electric power corresponding to required electric power from the power reception device paired by the pairing to the power reception device.

\* \* \* \* \*